(12) United States Patent
Burmester

(10) Patent No.: US 12,492,759 B2
(45) Date of Patent: Dec. 9, 2025

(54) LIFT VALVE HAVING LIFT DRIVE

(71) Applicant: GEA Tuchenhagen GmbH, Büchen (DE)

(72) Inventor: Jens Burmester, Grambek (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 18/681,730

(22) PCT Filed: Aug. 11, 2022

(86) PCT No.: PCT/EP2022/072503
§ 371 (c)(1),
(2) Date: Feb. 6, 2024

(87) PCT Pub. No.: WO2023/017106
PCT Pub. Date: Feb. 16, 2023

(65) Prior Publication Data
US 2024/0328534 A1 Oct. 3, 2024

(30) Foreign Application Priority Data
Aug. 13, 2021 (DE) .................. 10 2021 004 172.0

(51) Int. Cl.
*F16K 37/00* (2006.01)
*F16K 31/122* (2006.01)
(52) U.S. Cl.
CPC ...... *F16K 37/0041* (2013.01); *F16K 31/1221* (2013.01)

(58) Field of Classification Search
CPC .................. F16K 37/0041; F16K 31/1221
See application file for complete search history.

(56) References Cited

U.S. PATENT DOCUMENTS 5,144,977 A * 9/1992 Eggerton ............ F16K 37/0033
137/554
6,650,211 B2 * 11/2003 Pimouguet ........... H01H 13/186
335/205

(Continued)

FOREIGN PATENT DOCUMENTS

DE 199 39 497 A1 3/2001
DE 102013018564 A1 5/2015
(Continued)

*Primary Examiner* — Daphne M Barry
(74) *Attorney, Agent, or Firm* — Young Basile Hanlon & MacFarlane, P.C.

(57) ABSTRACT

A lift valve having a valve housing and a stroke drive is described. The stroke drive includes a drive rod that can be moved along a stroke axis into a first and a second end position. A measuring apparatus is coupled to the stroke drive on a side of the stroke drive facing away from the valve housing and includes a first sensor, a second sensor, and a first transducer. The first transducer is arranged to follow the movement of the drive rod and is arranged on a sensor rod arranged in an end region of the drive rod. To achieve a compact and safe design, a second transducer is arranged to follow the movement of the drive rod, the first sensor is arranged between the second sensor and the stroke drive. The first sensor is excited by the second transducer, which is arranged on a side of the first transducer facing the drive rod, when the drive rod is in the second end position.

18 Claims, 3 Drawing Sheets

(56) References Cited

U.S. PATENT DOCUMENTS

| | | | |
|---|---|---|---|
| 9,909,686 B2* | 3/2018 | Feinauer | F16K 37/0041 |
| 2005/0127200 A1 | 6/2005 | Cox et al. | |
| 2015/0075651 A1 | 3/2015 | Daniels | |
| 2015/0345645 A1* | 12/2015 | Kutney | F16K 37/0041 |
| | | | 251/285 |

FOREIGN PATENT DOCUMENTS

| | | |
|---|---|---|
| GB | 2194648 A | 3/1988 |
| WO | 02093058 A1 | 11/2002 |
| WO | 2016-146632 A1 | 9/2016 |

* cited by examiner

LIFT VALVE HAVING LIFT DRIVE

TECHNICAL FIELD

The invention relates to a lift valve having a lift drive.

BACKGROUND

Lift valves with stroke (or lift) drives are used in systems for the production of food products, beverages, medicines, and fine chemical products, as well as in biotechnology.

There are a variety of ways to incorporate the lift valve into a processing system in the aforementioned applications. What are known as control heads can be used. They then control the stroke drive, for example, by switching compressed air with what are known as pilot valves. The system controller simply gives commands to this control head. WO 2002/093058 A1 shows such an example.

However, lift valves are also incorporated into the processing system in a simpler manner without using a control head.

A rod portion connected to a valve rod of the lift valve is guided out of the stroke drive. A transducer that triggers a sensor is arranged on this rod portion. To be able to determine the two positions of the rod portion that correspond, for example, to the open and closed positions of the lift valve, two sensors are provided. The actuation of the stroke drive, for example, with compressed air, takes place via a correspondingly designed device of the processing system.

When a control head is used, the sensors are often arranged within the control head. This mechanically protects the sensors. With the simpler solution, there is a risk of the sensors being displaced. In the worst case, a part of the sensor can even be sheared off. In addition, with this arrangement, a body part, for example, a finger, of the operator or objects must be prevented from coming between the transducer and the sensor.

Until now, these risks have been remedied by additional components, for example, by an additional cylinder that surrounds at least the rod. Additional components, however, also require additional installation space.

A lift valve with a measuring apparatus for detecting the position of a stroke rod is known, for example, from GB 2194648 A.

SUMMARY

It is therefore an object of the invention to create an improved lift valve with a measuring device that is compact in design and safe.

An embodiment of the invention proceeds from a lift valve having a valve housing and a stroke drive, which comprises a drive rod that can be moved along a stroke axis into a first and a second end position, and a measuring apparatus, which is coupled to the stroke drive on a side of the stroke drive facing away from the valve housing and comprises a first sensor and a second sensor, and having a first transducer, which is arranged so as to follow the movement of the drive rod, wherein the first transducer is arranged on a sensor rod arranged in an end region of the drive rod.

An improvement is now that a second transducer, which is arranged so as to follow the movement of the drive rod, is provided, and the first sensor is arranged between the second sensor and the stroke drive, and the first sensor is excited by the second transducer, which is arranged on a side of the first transducer facing the drive rod, when the drive rod is in the second end position. Various operating principles are known in the prior art for sensors and transducers, for example, mechanical switches. It is less error-prone to choose a contactless measuring principle. It is cost-effective to design the sensors as proximity sensors that respond to metallic transducers.

With the structure described herein, the sensor placed closer to the stroke drive responds to a transducer when the drive rod is shifted the farthest in the direction of the sensors. This reversal of the measuring principle enables one of the transducers to be inserted into the stroke drive, at least into a coupling region of the stroke drive and measuring apparatus, and the sensor to be arranged with less than the full stroke distance. The structure according to claim 1 enables a considerably more compact and safer arrangement with a lift valve, stroke drive, and measuring apparatus. The more compact arrangement brings safety from mechanical impairment and entry of disruptive particles into the measuring apparatus.

In a first development, the error-proneness to objects between the sensor and the transducer is further improved, in that the sensor rod, the first transducer, and the second transducer have flush lateral surfaces. In the field of application, the flush lateral surfaces act as a continuous flat cylinder surface. In particular, this prevents a sensor from being sheared off by a transducer or a particle moved by a transducer.

In one development, the mechanical stability and thus safety can be increased in that the first transducer is designed integrally with the sensor rod. This advantage is further strengthened when, alternatively or additionally, the second transducer is designed integrally with the drive rod. In this case, the integral design can go so far that the transducer is inconspicuous, for example, only a shoulder or a step.

The entry of objects or particles into the measuring apparatus is reduced or prevented according to one development in that the measuring apparatus is closed with a cover on an end face facing away from the stroke drive. This can be a flat cover or a dome-like, hood-like structure. A rounded design is hygienically more advantageous, because corners and bends that are prone to soiling are reduced.

The design with a cover can additionally be improved in that the sensor rod is accommodated in the cover in a shiftable and sealed manner, the cover has an air port, and an air channel is formed in the sensor rod. For stroke drives operated with a pressure medium, the pressure medium of which is supplied via the drive rod, the design according to this development offers a compact and safe structure of the pressure medium supply.

A particularly compact design is achieved according to one development in that the stroke drive and the measuring apparatus are connected to each other in a coupling region, and the second transducer in the first end position is located at the height of the coupling region.

The safety is increased by a reduction of the entry of particles into the measuring device and in particular into the space between the sensors and the transducers in that the measuring apparatus comprises a hollow rod that completely surrounds the sensor rod.

A safe and reliable function of the measuring apparatus also depends on the exact setting of the sensors so that they are reliably activated by a transducer at the right time. According to a development, this is achieved where the first sensor is accommodated in a first elongated hole and the second sensor is accommodated in a second elongated hole.

The lift valve becomes cost-effective through simplified assembly in that, according to a development, the drive rod can be coupled to a valve rod of the lift valve.

Further assembly simplifications result when the drive rod is designed to be connectable to the sensor rod, in particular connectable by means of a screw connection.

The invention will be described and the advantages thereof explained in more detail based on an example embodiment.

DETAILED DESCRIPTION

Figure 1:
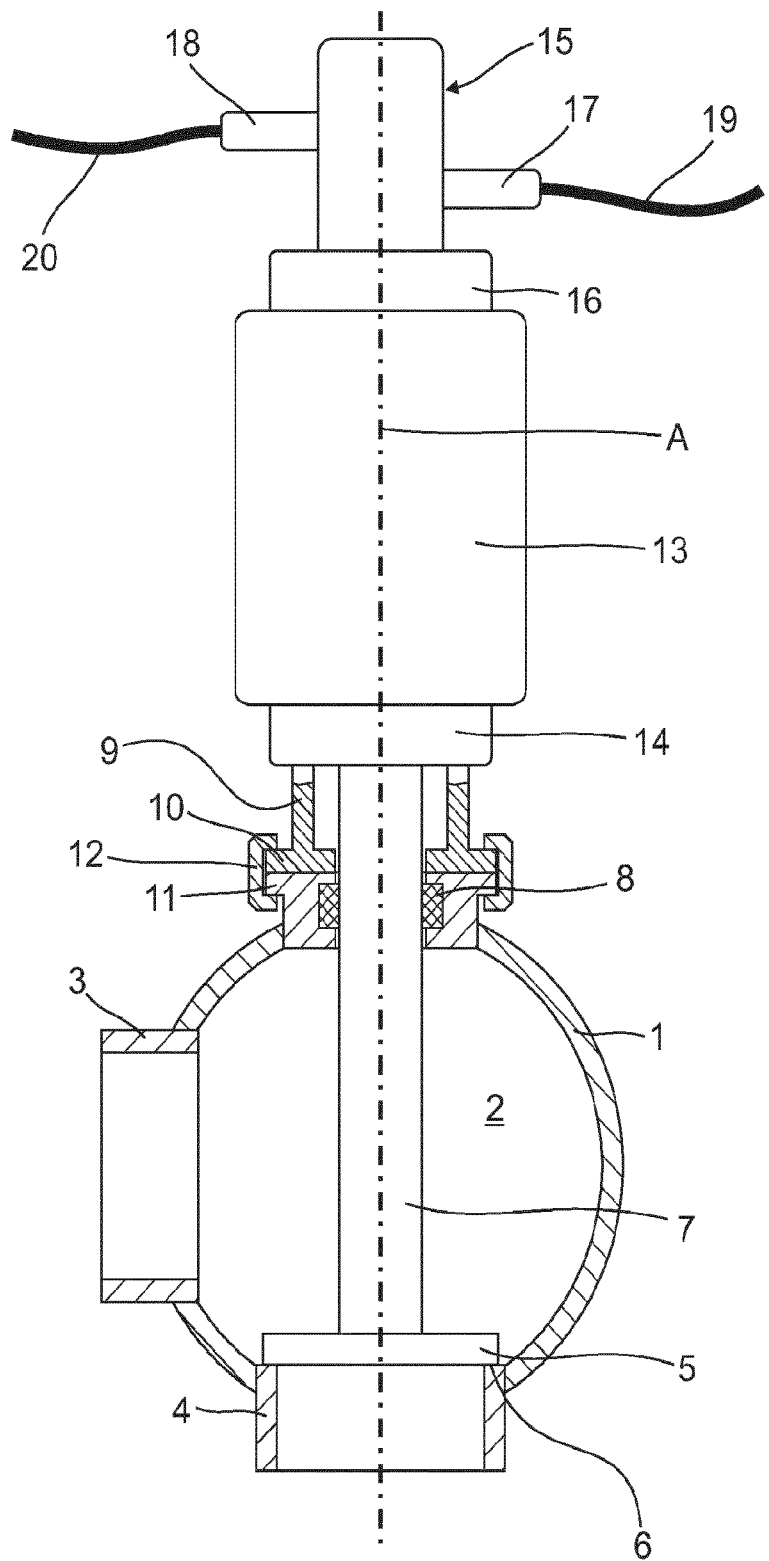
FIG. 1 is a sectional view through a lift valve with a stroke drive and a measuring apparatus in a schematic representation.

FIG. 1 shows a lift valve in a partially sectional view.

The lift valve has a valve housing 1 with an interior 2 designed to accommodate fluid. A first port 3 and a second port 4, which are fluidically connected to each other by the interior 2, are provided on the valve housing 1. The fluid connection can be switched. For this purpose, a closing body 5 is provided, which can be displaced along a stroke axis A. The closing body 5 can be brought into sealing contact with a valve seat 6, which is provided on the valve housing 1. When the closing body 5 and the valve seat 6 are in sealing contact, the fluid connection between the first port 3 and the second port 4 is interrupted.

The closing body 5 is located on a valve rod 7 and can be designed integrally with the valve rod 7. The valve rod 7 runs through a seal 8 that is provided in the valve housing 1 and can be designed as a combined bearing and seal. In this manner, the valve rod 7 protrudes out of the valve housing 1.

A skirt 9 can be releasably fastened to the valve housing 1. For this releasable connection, the skirt 9 can have a skirt flange 10, which can be brought into contact with a housing flange 11. The flanges 9 and 10 can be connected to each other releasably in both a force-fitting and form-fitting manner with a clamp 12.

A stroke drive 13, which can be coupled directly to the valve housing 1 when a skirt is not used, is connected to the skirt 9. The stroke drive 13 and the skirt 9 are connected to each other with a first coupling 14. Preferably, the first coupling 14 is designed to be releasable, for example, in the form of a clamped flange connection, as was described using the skirt 9 and the valve housing 1.

On the side of the stroke drive opposite the valve housing 1, a measuring apparatus 15 is arranged. The stroke drive 13 and the measuring apparatus 15 are preferably releasably coupled to each other. The connection is affected with a second coupling 16. This second coupling 16 can be designed as a clamp flange connection, screw connection, or the like. The second coupling 16 forms a spatial part, which is referred to here as the coupling region.

The measuring apparatus 15 includes (is shown as including) a first sensor 17 and a second sensor 18. The second sensor 18 is arranged on a side of the first sensor 17 facing away from the stroke drive 13. A first measuring line 19 connects the first sensor 17 to a device of a processing system. A second measuring line 20 connects the second sensor 18 to a device of the processing system.

Figure 2:
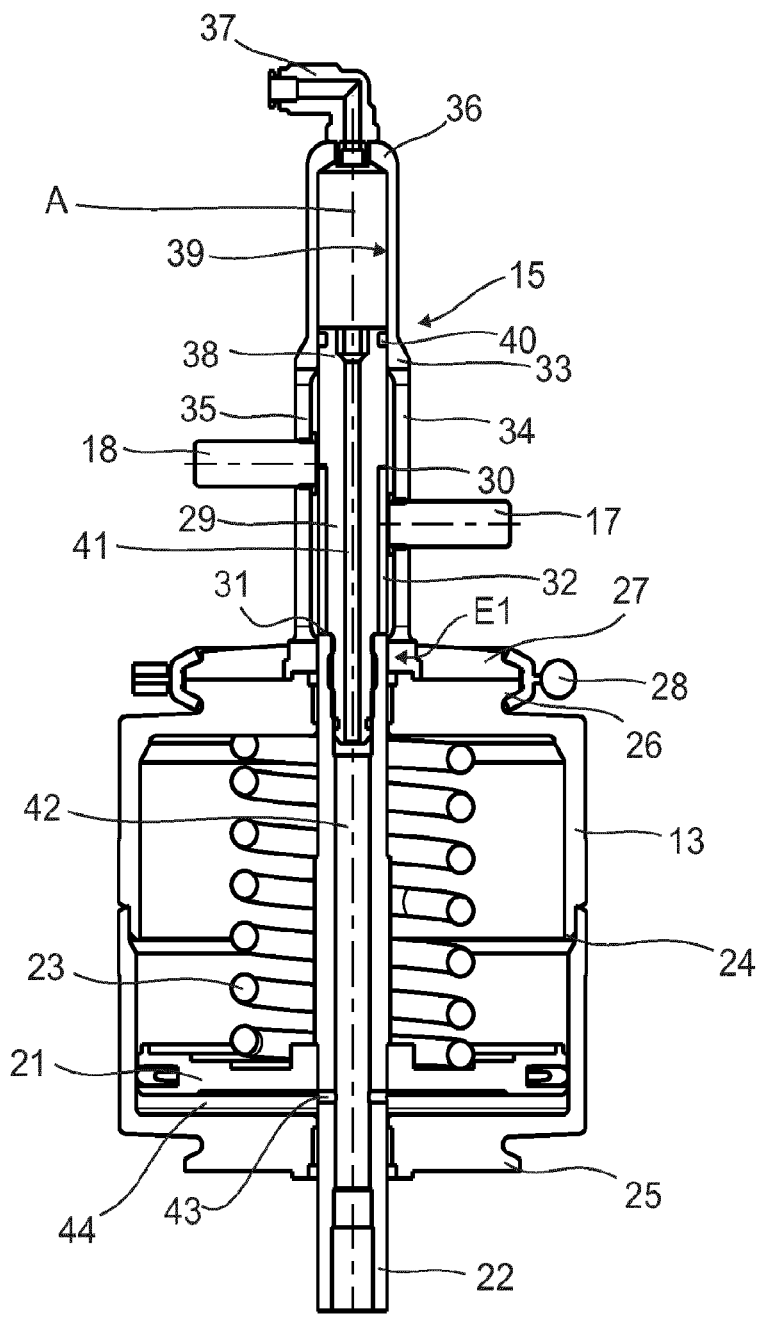
FIG. 2 is a sectional view along the stroke axis through the stroke drive and the measuring apparatus, wherein the stroke drive is in a first end position.
Figure 3:
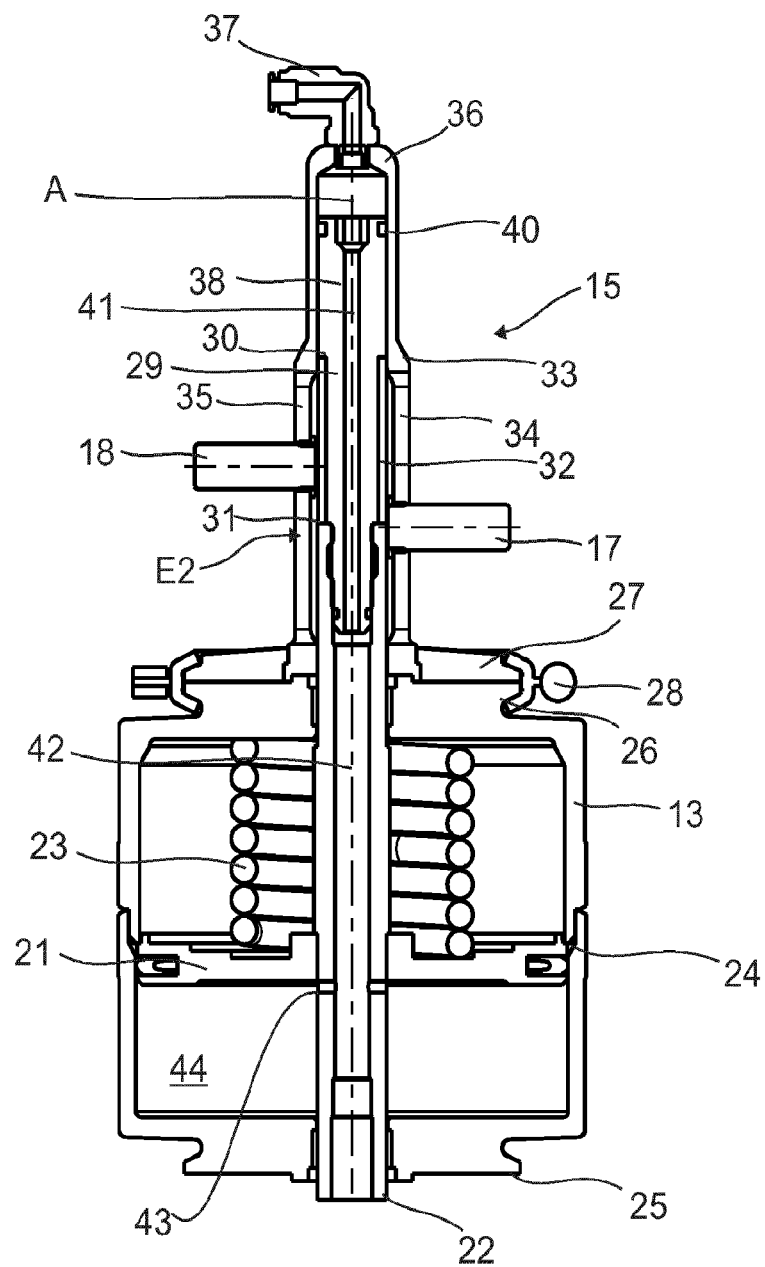
FIG. 3 is a sectional view along the stroke axis through the stroke drive and the measuring apparatus, wherein the stroke drive is in a second end position.

The stroke drive 13 and the measuring apparatus 15 are shown in FIG. 2 and FIG. 3 in sectional views along the stroke axis A.

The stroke drive 13 is designed to be operable with a pressure medium and comprises a piston 21, which can be moved along the stroke axis A and interacts with a drive rod 22, in particular entraining the drive rod 22 with its movement. The drive rod 22 can be connected to the valve rod 7 in a manner suitable for force transmission in the direction of the stroke axis A. Screw connections and couplings made of half shells are known for this.

The piston 21 can be pretensioned in one of its movement directions along the stroke axis H by a spring 23 or a spring assembly. Alternatively, or additionally, both sides of the piston 21 can be designed so that a pressure medium can be applied.

The movement of the piston 21 in the direction of the spring 23 is limited by a stop 24 provided on the housing side. This establishes the position of the piston 21 in the second end position E2 of the drive rod 22 shown in FIG. 3. The position of the piston shown in FIG. 2 corresponds to the first end position E1 of the drive rod 22. The piston 21 is located on an end of the stroke that lies on a side of the stroke drive 13 facing the valve housing 1. In the example shown, this is the closed position of the valve. For this first end position E1, a stop can also be provided, for example, when a radial seal is arranged between the closing body 5 and the valve seat 6. Alternatively, the position can be established by the closing body 5 when it has been brought into contact with the valve seat 6.

The stroke drive 13 comprises a component that forms a part of the first coupling 14, which is schematically shown in FIG. 1. This component can be designed as a first flange 25 and is arranged on a side of the stroke drive facing the valve housing 1.

On a side of the stroke drive 13 opposite the first flange 25 and thus on a side of the stroke drive 13 facing away from the valve housing 1, the second coupling 16 is located, with which the measuring apparatus 15 is releasably fastened to the stroke drive 13. This second coupling 16 can have a second flange 26, which is attached to the stroke drive 13, and a counterflange 27, which is provided on the measuring apparatus 15. The second flange 26 and the counterflange 27 can be releasably fixed with a coupling clamp 28.

In the measuring apparatus 15, a sensor rod 29 is movably arranged along the stroke axis A. The sensor rod 29 is designed to be connectable to the drive rod 22, for example, with a screw connection in which one of the rods has an external thread and the other rod has a hole with an internal thread.

The sensor rod 29 comprises a first transducer 30. The first sensor 17, second sensor 18, and first transducer 30 are preferably designed to be based on a contactless operating principle. The sensors 17 and 18 can be proximity switches or, respectively, proximity sensors.

The first transducer 30 is advantageously designed as a shoulder of the sensor rod 29. The sensor rod 29 has a change in its diameter, resulting in a difference in the distance between a surface of the sensor rod 29 and the second sensor 18 depending on the position of the sensor rod 29 along the stroke axis. In particular, this distance changes during the switching process of the stroke drive 13, in which the sensor rod 29 and the first transducer 30 are entrained.

This distance change causes an excitation of the second sensor 18. The position of the sensor rod 29 associated with the activated state of the second sensor 18 is shown in FIG. 2, in which the stroke drive 13 is in the first end position E1. An excitation of the second sensor 18 therefore means that the stroke drive 13 is in the first end position E1.

The first transducer 30 can be designed as an additional component, for example, as a ring. Preferably, however, the sensor rod 29 and the first transducer 30 are designed integrally. This is more cost-effective in production and safe to operate because the position of the first transducer 30 on the sensor rod 29 cannot change.

A second transducer 31 is provided, which is entrained by the drive rod 29 during movement of the drive rod 29 along the stroke axis A.

Like the first transducer 30, the second transducer 31 can also be designed as an additional component, for example, as a ring. Preferably, however, the second transducer 31 is designed integrally with the drive rod 22. This is more cost-effective in production and safe to operate because the position of the first transducer 30 on the sensor rod 29 cannot change. Preferably, one end of the drive rod 22 acts as a second transducer 31 in that an outer diameter of the drive rod 22 is larger than an outer diameter of the sensor rod 29. In this manner, a shoulder, or respectively a step, is formed. This shoulder excites the proximity sensor, in this case specifically the first sensor 17, as soon as the drive rod is in the second end position E2 according to FIG. 3. This is because then the second transducer 31 in the form of the shoulder and the first sensor 17 are located at the same height along the stroke axis A.

Until now, it was typical to detect the end position E1 with the first sensor 17 and the end position E2 with the second sensor 18. In the device presented here, in contrast, the end position E1 according to FIG. 2 is detected with the second sensor 18, while the end position E2 according to FIG. 3 is detected with the first sensor. The sensor placed closer to the stroke drive 13 therefore measures the position in which the drive rod 22 is shifted the farthest in the direction of the measuring apparatus 15.

One advantage is the shortening of the arrangement consisting of the stroke drive 13 and the measuring apparatus 15 that is possible due to this structure. This results when the second transducer 31 in the first end position E1 is moved into the region of the second coupling 16, meaning at its axial height in relation to the stroke axis A. Due to the coupling components, this region is not accessible for a measurement and only the reversal of the measurement makes it possible to position the second transducer 31 in the first end position E1 in this way. Another advantage is that the sensors 17 and 18 no longer have to be spaced apart from each other along the stroke axis A by the length of the valve stroke. This also enables a more compact design.

This basic principle can be expanded with advantageous developments.

A liner 32 can be provided, which is arranged on the sensor rod 29. The liner 32 extends in the direction of the stroke axis A between the first and second transducers 30 and 31. The liner 32 and the two transducers 30 and 31 are designed so that their lateral surfaces are flush with one another. This prevents one of the transducers 30 or 31 from colliding directly with one of the sensors 17 or 18 or a particle from being pressed by the transducer 30 or 31 against the sensor 17 or 18. This pressing or a collision can displace or even destroy the sensor 17 and 18. The aforementioned design of the lateral surfaces prevents this. The liner 32 also prevents a possible source of danger from shearing off or collision of body parts. Due to the flush lateral surfaces of the liner 32 with the transducer 30, purely tangential contacts are possible. The liner 32 can be a sleeve that can be slid on or a cast-on component. The material of the liner 32 is chosen so that it does not excite the sensors 17 and 18 and does not impair the functions of the transducers 30 and 31 and sensors 17 and 18.

Two additional measures, each on its own or both together, improve the safety of the measuring apparatus 15 from entry of objects into the space between the transducers 30 and 31 and the sensors 17 and 18.

A first measure is to provide the measuring apparatus 15 with a hollow rod 33. The hollow rod 33 extends over a full length that the sensor rod 29 protrudes out of the stroke drive 13 along the stroke axis A. Furthermore, the hollow rod 33 surrounds the sensor rod 29 completely in the circumferential direction.

The hollow rod 33 is interrupted to enable the sensors 17 and 18 access to the transducers 30 and 31. This can occur in the form of a first elongated hole 34, in which the first sensor 17 is accommodated, and a second elongated hole 35, in which the second sensor 18 is mounted. The elongated holes allow the sensors 17 and 18 to be positioned and in particular shifted along the stroke axis A. Preferably, the hollow rod 33 has as few interruptions as possible, for example, the mentioned elongated holes 34 and 35 and a drainage opening, if necessary, and an air port as described below.

A second measure is to close an end face of the measuring apparatus 15 located on a side of the measuring apparatus facing away from the stroke drive 13 with a cover 36. This prevents an end of the sensor rod 29 from colliding with objects and prevents objects from entering the measuring apparatus 15. In this way, the sensor rod 29 is accommodated in the cover in a shiftable and sealed manner.

The measuring apparatus 15 can have a single-part housing. The hollow rod 33 and the cover 36 can then be formed thereon. This is structurally simple and hygienically advantageous.

The measuring apparatus according to this example is developed so that it contains a simple and safe as well as compact air supply for the stroke drive 13.

The cover 36 has an air port 37 that is arranged, for example, on an end face. On an end facing away from the stroke drive 13, the sensor rod 29 comprises a piston portion 38 that can be moved along a running surface 39. A piston seal 40 seals between the piston portion 38 and the running surface 39. The sealing effect remains over the entire stroke and thus the movement between the first and second end positions E1 and E2.

An air channel 41 runs completely through the sensor rod 29 in the direction of the stroke axis A.

The air channel 41 is connected in a fluid-conducting manner to a second air channel 42, which is provided in the drive rod 22. The second air channel 42 is connected to a pressure chamber 44, which is located on the side of the piston 21 facing away from the spring 23, with the aid of an outlet 43.

A pressure medium, for example, pneumatic air, enters through the air port 37 into the air channel 41, from there into the second air channel 42 and through the outlet 43 into the pressure chamber 44 and applies pressure to the piston 21. With correspondingly high pressure, the counterforce of the spring 23 is overcome, the piston 21 is shifted, and as a result the lift valve is switched.

The following is a list of reference signs used in this specification and in the drawings.

1 Valve housing
2 Interior
3 First port
4 Second port
5 Closing body
6 Valve seat
7 Valve rod
8 Seal
9 Skirt
10 Skirt flange
11 Housing flange
12 Clamp
13 Stroke drive
14 First coupling
15 Measuring apparatus
16 Second coupling
17 First sensor
18 Second sensor
19 First measuring line
20 Second measuring line
21 Piston
22 Drive rod
23 Spring
24 Stop
25 First flange
26 Second flange
27 Counterflange
28 Coupling clamp
29 Sensor rod
30 First transducer
31 Second transducer
32 Liner
33 Hollow rod
34 First elongated hole
35 Second elongated hole
36 Cover
37 Air port
38 Piston portion
39 Running surface
40 Piston seal
41 Air channel
42 Second air channel
43 Outlet
44 Pressure chamber
A Stroke axis
E1 First end position
E2 Second end position

The invention claimed is:

1. A lift valve, comprising:
a valve housing;
a stroke drive including a drive rod that can be moved along a stroke axis into a first end position and a second end position; and
a measuring apparatus coupled to the stroke drive on a side of the stroke drive facing away from the valve housing and including a first sensor, a second sensor, a first transducer arranged to follow movement of the drive rod and arranged on a sensor rod arranged in an end region of the drive rod, and a second transducer arranged on a side of the first transducer facing the drive rod and arranged to follow the movement of the drive rod, wherein the first sensor is arranged between the second sensor and the stroke drive, the first sensor is excited by the second transducer when the drive rod is in the second end position, the first sensor is accommodated in a first elongated hole, and the second sensor is accommodated in a second elongated hole.

2. The lift valve according to claim 1, wherein the sensor rod, the first transducer, and the sensor transducer have flush lateral surfaces.

3. The lift valve according to claim 1, wherein the first transducer is designed integrally with the sensor rod.

4. The lift valve according to claim 1, wherein the second transducer is designed integrally with the drive rod.

5. The lift valve according to claim 1, wherein the measuring apparatus is closed with a cover on an end face facing away from the stroke drive.

6. The lift valve according to claim 5, wherein the sensor rod is accommodated in the cover in a shiftable and sealed manner, the cover has an air port, and an air channel is formed in the sensor rod.

7. The lift valve according to claim 1, wherein the stroke drive and the measuring apparatus are connected to each other in a coupling region, and the second transducer in the first end position is located at a height of the coupling region.

8. The lift valve according to claim 1, wherein the measuring apparatus comprises a hollow rod that completely surrounds the sensor rod.

9. The lift valve according to claim 1, wherein the drive rod is coupled to a valve rod of the lift valve.

10. The lift valve according to claim 1, wherein the drive rod is connectable to the sensor rod.

11. The lift valve according to claim 10, wherein the drive rod is connectable to the sensor rod by means of a screw connection.

12. The lift valve according to claim 2, wherein the first transducer is designed integrally with the sensor rod.

13. The lift valve according to claim 2, wherein the second transducer is designed integrally with the drive rod.

14. The lift valve according to claim 2, wherein the measuring apparatus is closed with a cover on an end face facing away from the stroke drive.

15. The lift valve according to claim 14, wherein the sensor rod is accommodated in the cover in a shiftable and sealed manner, the cover has an air port, and an air channel is formed in the sensor rod.

16. The lift valve according to claim 2, wherein the stroke drive and the measuring apparatus are connected to each other in a coupling region, and the second transducer in the first end position is located at a height of the coupling region.

17. The lift valve according to claim 2, wherein the measuring apparatus comprises a hollow rod that completely surrounds the sensor rod.

18. The lift valve according to claim 2, wherein the drive rod is coupled to a valve rod of the lift valve.

* * * * *